United States Patent
Jennings (10) Patent No.: US 12,157,684 B2
(45) Date of Patent: *Dec. 3, 2024

(54) INTEGRATED POWER SYSTEM

(71) Applicant: John Walter Jennings, Chandler, AZ (US)

(72) Inventor: John Walter Jennings, Chandler, AZ (US)

( * ) Notice: Subject to any disclaimer, the term of this patent is extended or adjusted under 35 U.S.C. 154(b) by 441 days.

This patent is subject to a terminal disclaimer.

(21) Appl. No.: 17/571,456

(22) Filed: Jan. 8, 2022

(65) Prior Publication Data

US 2022/0127168 A1 Apr. 28, 2022

Related U.S. Application Data

(63) Continuation-in-part of application No. 16/893,301, filed on Jun. 4, 2020, now Pat. No. 11,319,221, which (Continued)

(51) Int. Cl.
*C02F 1/44* (2023.01)
*B01D 61/08* (2006.01)
(Continued)

(52) U.S. Cl.
CPC ............ *C02F 1/441* (2013.01); *B01D 61/08* (2013.01); *B01D 71/0211* (2022.08); *C02F 1/004* (2013.01); *C02F 1/005* (2013.01); *C02F 7/00* (2013.01); *F03B 13/06* (2013.01); *F03B 13/10* (2013.01); *F03B 17/062* (2013.01); *B01D 2313/367* (2022.08); *B01D 2313/501* (2022.08); *C02F 2103/002* (2013.01); *C02F 2103/08* (2013.01); *C02F 2103/10* (2013.01); *C02F 2301/026* (2013.01); *C02F 2301/04* (2013.01); *C02F 2303/10* (2013.01); *F05B 2210/11* (2013.01); *F05B 2220/62* (2013.01)

(58) Field of Classification Search
None
See application file for complete search history.

(56) References Cited

U.S. PATENT DOCUMENTS

10,689,266 B1 * 6/2020 Jennings ................. C02F 1/008
11,319,221 B2 * 5/2022 Jennings ................. F03B 13/08
(Continued)

*Primary Examiner* — Krishnan S Menon
(74) *Attorney, Agent, or Firm* — Invention To Patent Services; Alex Hobson (57) ABSTRACT

An exemplary power system utilizes turbines configured within a water intake conduit to the desalination processor to produce power for the desalination processor. Water intakes are configured to provide a natural flow of water to the desalination processor though hydrostatic pressure. One or more turbines coupled with the water intake conduits are driven and produce power for the system. The desalination processor incorporates Graphene filters to and may include a structured water system to increase the H3O2 concentration of the water prior to Graphene filters. Discharge water may be pumped back into the body of water but be separated from the intakes. A secondary power source, such as a renewable power source, may be used to produce supplemental power for the system. Power produced may be provided to a secondary outlet, such as a power grid, all above and/or underground.

20 Claims, 9 Drawing Sheets

Related U.S. Application Data is a continuation-in-part of application No. 16/478,895, filed as application No. PCT/US2019/015286 on Jan. 25, 2019, now Pat. No. 10,689,266.

(60) Provisional application No. 63/228,123, filed on Aug. 1, 2021, provisional application No. 62/948,358, filed on Dec. 16, 2019, provisional application No. 62/497,313, filed on Jan. 26, 2018.

(51) Int. Cl.
| | |
|---|---|
| *B01D 71/02* | (2006.01) |
| *C02F 1/00* | (2023.01) |
| *C02F 7/00* | (2006.01) |
| *C02F 103/00* | (2006.01) |
| *C02F 103/08* | (2006.01) |
| *C02F 103/10* | (2006.01) |
| *F03B 13/06* | (2006.01) |
| *F03B 13/10* | (2006.01) |
| *F03B 17/06* | (2006.01) |

(56) References Cited

U.S. PATENT DOCUMENTS

| | | | |
|---|---|---|---|
| 2004/0206681 A1* | 10/2004 | Gordon | C02F 1/441 |
| | | | 210/259 |
| 2018/0015428 A1* | 1/2018 | Nardella | B05B 17/08 |
| 2018/0179094 A1* | 6/2018 | McGhee | C02F 1/005 |
| 2018/0244538 A1* | 8/2018 | Tassen | F15D 1/009 |
| 2019/0225521 A1* | 7/2019 | Heath | C02F 1/48 |
| 2019/0263686 A1* | 8/2019 | Karren | A61L 2/18 |

* cited by examiner

INTEGRATED POWER SYSTEM

CROSS REFERENCE TO RELATED APPLICATIONS

This application is a continuation in part of U.S. patent application Ser. No. 16/893,301, filed on Jun. 4, 2020 and currently pending, which is a continuation in part of U.S. patent application Ser. No. 16/478,895, filed on Jul. 18, 2019 and issued as U.S. Pat. No. 10,689,266, on Jun. 23, 2020, which is a national stage application of PCT application No. PCT/US2019/015286, filed on Jan. 25, 2019, which claims the benefit of priority to U.S. provisional patent application No. 62/497,313, filed on Jan. 26, 2018, and U.S. patent application Ser. No. 16/893,301, claims the benefit of priority to U.S. provisional patent application No. 62/948,358, filed on Dec. 16, 2019, and this application claims the benefit of priority to U.S. provisional patent application No. 63/228,123, filed on Aug. 1, 2021; the entirety of each of application listed herein is hereby incorporated by reference herein.

BACKGROUND OF THE INVENTION

Field of the Invention

The invention relates to an integrated power system that produces power and processed potable water from a variety of sources including salt and fresh water, such as from the ocean, sea, lakes and rivers, and other fresh water, grey water and water associated with oil fracking or hydraulic fracturing as well as reservoirs under a body of water floor.

Background

Clean water sources are becoming more and more scarce. Pollution and contamination from a wide range of sources have polluted many of the bodies of water, requiring filtration and chemical processing to produce clean potable water from these sources. Salt water body sources, due to their large volume, can be cleaner but require desalination for use. Desalination requires power to process the water and this power requirement makes desalination cost ineffective.

SUMMARY OF THE INVENTION

The invention is directed an integrated power system that combines a desalination system with a power production. In an exemplary embodiment, intake water is drawn from a body of water, such as the ocean, sea, lake or river, and such as reservoirs under a body of water floor, and through conduits that extend down into the body of water to produce a hydrostatic head that will force water into a desalination system. The intake conduit may extend down below the floor of the body of water a filtration intake dept of at least 5 m or more, at least 10 m or more, at least 50 m or more, at least 100 m or more. A greater depth may provide higher filtration of the water from the body of water into the below-floor water source. The hydrostatic head also forces the intake water through turbines that produce power for the system and may produce excess power that can be stored in batteries for later use, or may be provided to a power grid.

The integrated power system and/or the desalination system may be configured substantially or entirely underground. The intake conduit may extend from the desalination system or a tank and extend underground to the intake. The desalination system may be underground as well as the power system. These components and systems may be configured on shore and may be covered with earth or sand to minimize aesthetic concerns and to protect the system from damage due to weather including hurricanes and strong storms. When secondary power systems are used such as solar or wind turbines, they would be exposed. An integrated power system and/or the desalination that is configured substantially underground has both the desalination system and power systems configured underground, along with the intake conduit.

An exemplary integrated power system receives water from a salt, fresh or brackish water source, or body of water, such as an ocean, sea, lake, bay, river, or canal for example, or from a water source configured under the body of water floor. The various bodies of water may have different floor terrain and may have a gradual drop in the floor or a more abrupt drop from the shore to a deep floor. The water intakes may be configured some distance from the shore of the body of water. The intake conduit may extend any suitable distance out into or under the body of water, such as about 10 m or more, about 50 m or more, about 100 m or more, about 500 m or more and any range between and including the values provided.

In an exemplary embodiment, the water intake is configured be configured an intake depth below the body of water floor, such as on the order of ten meters or more, 100 meters or more, 500 meters or more, 1,000 meters or more and any range between and including the intake depths provided. The water intake may be configured in a below-floor water source, below another body of water floor, such as an ocean, sea, lake, bay, sound and the like and may be a depth below the body of water floor of about 35 ft or more, about 50 ft or more, about 100 ft or more, about 250 ft or more, about 500 ft or more, about 1000, ft or more and any range between and including the depths provided. The intake conduit may extend from shore at a drill angle down under the body of water floor. The drill angle may be about 5 degrees or more, about 15 degrees or more, about 20 degrees or more and any range between and including the drill angles provided. This below-floor water source may be fresh water that would not require desalination and may be cleaner water as it has been filtered through the ground between water source and the below-floor water source.

An intake conduit may extend from a platform that is configured out over a body of water, such as the ocean, bay, sea, river, sound, etc. The intake conduit may extend down from the platform down through the body of water and then down below the body of water floor a depth until it reaches below-floor water source. The power and/or desalination system may be configured on the platform. An intake conduit may extend from a conduit drilled from a platform back to shore and the power and/or desalination system may be configured on shore. Furthermore, an intake conduit may extend down from land into a below-floor water source that extends from under the body of water floor under the shore. This may enable substantially straight down drilling.

An intake conduit may extend from a location on land down to a deep water source a depth below the ground level or a ground surface of about 10 m or more, about 150 m or more, about 200 m or more about 300 m or more about 500 m or more, about 650 m or more and even 1,000 m or more. These deep water sources may be fresh water and may not require the desalination system but may be used with the power system as described herein. Conventional wells are typically on the order of 30 m or more deep, or even 50 or 100 m deep but typically do not extend down to deep water sources as described herein and defined by the depths listed.

An intake conduit may comprise a conduit extension that extends out from a desalination system to the water intake. The water intake conduit is configured below the body of water floor an intake depth. The conduits may also extend above a level of the intake and water may flow through as syphoned water to the desalination system. The hydrostatic head forces water from the body of water into the desalination processor.

In an exemplary embodiment, a portion of the water intake conduit, such as conduit extension, extends from the water intake of the desalination system above the body of water floor; wherein a portion of the water intake conduit, such as the conduit extension, extends along the floor of the body of water between the intake base and the desalination system, and may extend along or above the ground to the desalination system. The hydrostatic pressure in the water intake conduit increases the deeper the water intake goes below the floor of the body of water. A discharge conduit from the desalination processor may extend back into the body of water to discharge salt water from the processor back into the body of water. Also, salt may be a byproduct of the system that may be used for commercial purposes. The discharge outlet in the body of water may be separated from the intake conduit an offset distance to ensure the salinity of the water at the intake is not increased due to this discharge. This discharge offset distance may be about 10 m or more, about 50 m or, more, about 100 m or more and any range between and including the values provided. A water intake conduit may extend from the water intake to the filtration system with may be below the depth level of the water intake, thereby further increasing the hydrostatic head to the filtration system.

Desalinated water is produced by either using brackish water having a salt content of 10,000 mg/L or less, or seawater having a salinity of about 30,000 to 44,000 mg/L. Desalinated water has a salinity of not more than about 500 mg/L and preferably no more than 200 mg/L.

In an exemplary embodiment, one or more turbines are coupled with the intake conduit to produce power from the flow of water into and through the intake and/or conduit extension from the intake to the desalination processor, and possibly within the water pipes throughout the city, possibly at the Pressure Release Valves where excess pressure and power are captured by these turbines. The power produced from these turbines may be provided to the power system and a controller may determine if the power is stored in a battery, used to power the components of the system or provided to a secondary outlet, such as a generator to a power grid. An exemplary power system may comprise one or more secondary power sources including, but not limited to, wind power source or turbine, a solar power source such as a photovoltaic cell, a nuclear power generator such as a small modular reactor (SMR), a generator and the like. It may be preferable that the secondary power source is renewable and the proximity of the system to a body of water may make wind turbines a preferred choice, as sustained winds are common along the shore of large bodies of water. Hydroelectric turbines can be placed at the pressure release valves to capture all the energy that is being wasted into the atmosphere or pipes. Therefore, as the water flows to through pipes to a municipal water supply it will be turning the hydroelectric turbines and generating power which may be supplied to a power grid or into batteries.

Power produced by the power system may be stored in a battery or battery pack for later use. For example, power produced by the turbines and by the secondary source may be stored in the battery and during the day or when the secondary source produces power and then drawn from at night, when the wind or photovoltaic cells are not producing much if any power. Also, power may be drawn from or delivered to a power grid, through power lines above and/or underground. A pump may be configured to increase the pressure of the process fluid or water prior to it passing through the turbine. A high pressure pump may increase the pressure of the process water flow through a turbine to about 100 psi or more, about 250 psi or more, about 500 psi or more, about 1,000 psi or more, about 1500 psi or more and any range between and including the process water pressure values provided. A turbine may be able to generate a large amount of electrical power such as 1 Mega Watts (MW) or more, about 5 MW or more, about 10 MW or more, about 20 MW of more. Turbines and an optional high pressure pump may be configured along the water intake conduit, between a tank and the filtration system, between the filtration system and discharge or between a tank and a discharge conduit, or along a flow route to final discharge location such as a municipality or a process facility and the like.

An exemplary power system may also produce power from a flow of water from a water tank. An exemplary water tank may hold about 1,000,000 gallons or more, about 10,000,000 gallons or more, about 25,000,000 gallons or more of water. The tank may be elevated above the ground to provide potential energy to push the water to a secondary location, such as a municipal water supply for general use, including drinking. Desalinated clean water may flow or be pumped into a tank from the desalination processor and a flow of water from this tank may drive turbines to produce additional power. In an exemplary embodiment, a tank is an elevated tank, such as a conventional water tower, and turbines are configured with the water tank outlet conduit to produce power when water is discharged from the tank. This water may flow to a reservoir, business, manufacturing or processing plant or to a residential area, such as for municipal water supply. Note that turbines may be configured in any of the tank conduits, or conduits extending from the water tank to a secondary location, such as along pipes to a municipal water supply system.

An exemplary battery for the storage of power may be any suitable type of battery including Iron and Water, lead acid, metal hydride, rechargeable nickel metal hydride, fuel cell, electrochemical flow battery comprising ion exchange membrane and the like.

The power system and desalination system as well as valves and turbines can be controlled by one or more computers and may be configured for at least partial control based on power demand. The power demand may change throughout the day and the controller may automatically monitor the demand and adjust parameters and water flow accordingly. Also, control parameters and settings may be monitored through mobile devices, such as on a mobile phone. An App or other interface program may allow a mobile device, such as a mobile phone to control the systems remotely.

An exemplary desalination system comprises a desalination processor comprising a plurality of filters to convert salt water to desalinated water, or water to have a salinity of less than about 500 mg/L. An exemplary desalination processor comprises a pre-filter to remove particles from the intake water, a structured water system that spirals the water to increase the $H_3O_2$ concentration, a Graphene filter, nano or other technology may comprise a plurality of layers of graphene or filter, and a post filter which may be an absorbent filter such as an activated carbon filter, gravel, etc. Other state of the art filters may be employed to remove particles, harmful components of the water and to desalinate the water. The desalinated water may be further processed through a structured water system prior to delivery to a tank, such as a water storage tank, a reservoir or a municipal water supply.

An exemplary pre-filter is a physical filter such as screen or netting material having an opening or series of openings through the thickness of multiple layers. The openings may be no more than about 25 mm, no more than about 10 mm, no more than about 5 mm, no more than about 2 mm, no more than about 1 mm and any range between and including the opening sized provided.

An exemplary structure water system produces water with a higher concentration of $H3O2$ molecules than distilled water, such as about 10% higher or more, about 20% higher or more, about 50% higher or more and any range between and including the concentrations provided. A structured water system may cause the water to flow in a circle or spiral that this may be done by the Coriolis Effect or by a particular geometry of a structure water component. Structured water is a molecular arrangement of water molecules that exists when water is near hydrophilic (water loving) surfaces. Much like ice, water molecules join together in hexagonally structured single layer sheets. Unlike ice, however, the sheets are flexible and move independently as they are not glued together by protons. The majority of the water in your body is structured water as your bodily tissues are hydrophilic. Vortexing creates Structured Water. In a properly designed vortex, some water molecules dissociate into hydrogen and oxygen. This newly created oxygen and any oxygen already dissolved in the water is mixed uniformly. Oxygen itself is a hydrophilic element. Hexagonal sheets of structured water grow outward from the oxygen, layer by layer. Structured water involves arranging water molecules into groups, rather than disordered or random ordered $H2O$ molecules. In fact, a healthy portion of the water actually changes its chemical formula to $H3O2$, as verified by Dr. Gerald Pollack of Washington State University. The condition is triggered by motion and vibrations, all the way down to the material present as the water flows.

An exemplary structured water system utilizes a vortexing device, (vortexer) that works on the premise of double vortexing and the piezo-crystal effect.

For biological use, healthier water is delivered via increased oxygen, increased wetting, reduced pathogens and results in greater crop growth and a significant increase in human and animal health. Structured water is a battery that needs constant charging. Energized structured water recharges the liquid battery of the body. When the body has sufficient energy, its aqueous interior is highly charged allowing for optimized cellular and metabolic function in addition to greater hydration and detoxification.

The totality of structured water does not just include the hexagonal sheets of water molecules mentioned earlier, but also the water immediately surrounding them. As the hexagonal layers grow, protons are ejected into the nearby water. This creates a most unexpected phenomenon—an electrical potential (voltage) between the structured water and the water surrounding it. In other words, structured water stores energy, much like a battery. Structured water grows (charges) by absorbing radiant energy. Both light waves and infrared waves, for example, charge structured.

An exemplary structured water system may be configured between the intake conduit and the desalination processor, in the discharge conduit or coupled with the discharge conduit to treat the discharge from the desalination processor and/or with the outlet of a reservoir, such as a water tank to treat the water prior to distribution, such as to a municipal water supply.

An exemplary graphene filter, nano or other technology comprises a plurality of layers of graphene or other technology of filters, such as about 2 or more, about 5 or more, about 10 or more, about 50 or more and any range between and including the number of layers provided. In addition, apertures may be formed through one or more of the Graphene layers to promote flow and these apertures may be very small, such as about 10 microns or less, about 5 microns or less, about 2 microns or less, sub-micron, such as less than 1 micron and even less than about 0.5 microns and any range between and including the aperture sizes provided.

In an exemplary embodiment, Graphene filters are utilized for the reverse osmosis process that is used in this saltwater desalination plant. This type of metal, Graphene, is an entirely new metal used to only allow the smallest water molecules to pass through the barrier in the reverse osmosis process for superior cleaning of the water. The excess or discharge is then pushed back out into the ocean down current so as not to be sucked back in to the intake. The amount of power needed to push the salt water through the Graphene filter is only about 50% of what the standard reverse osmosis filters use.

Graphene is a two-dimensional mesh of carbon atoms arranged in the form of a honeycomb lattice. It has earned the title "miracle material" thanks to a startlingly large collection of incredible attributes. A Graphene layer is very thin, one atom thick and therefore requires a stack of about three million layers to make a 1 mm thick sheet. Graphene is light and strong and has very good heat and electrical conductivity. For filtration application, such as water filtration, Graphene is initially hydrophobic and repels water, but when the narrow pores are wet with water, by pressure or a pre-wetting surfactant, water permeates through the Graphene pores and layers and it is a very effective filter, removing salt in a desalination process. Stacks of Graphene sheets, having very pores therethrough, may be an effective water filter, because they are able to let water molecules pass but block the passage of contaminants and substances. Graphene's small weight and size can contribute to making a lightweight, energy-efficient and environmentally friendly generation of water filters and desalination systems.

It has been discovered that thin membranes made from graphene oxide are impermeable to all gases and vapors, besides water, and further research revealed that an accurate mesh can be made to allow ultrafast separation of atomic species that are very similar in size—enabling super-efficient filtering. This opens the door to the possibility of using seawater as a drinking water resource, in a fast and relatively simple way.

An exemplary system may process a very large quantity of water, such as 100 gallons per minute (GPM), 500 GPM, 1,000 GPM, 5,000 GPM, 100,000,000 gallons per day (GPD) and any range between and including the water rates provided. The combined power produced by the turbines and solar panels of the system may be as high as 1 MegaWatts or more, 5 MegaWatts or more, 10 MegaWatts or more, 20 MegaWatts or more and any range between and including the values provided. An exemplary integrated power system may be configured for power supply to the power grid and may be a large scale system as described above. The system may also be configured for residential use and may be configured to provide power and water to one or more homes. Excess power may be provided to a power grid and residents may receive a credit or payment for power generation.

In an exemplary embodiment, most, if not all of the components of the integrated power system are configured above and below ground. The water intake may be below the surface of the water and then extend above and/or below the floor of the body of water underground to an underground desalination system. Power produced by the turbines may be distributed by power lines that are also above and/or underground. A water tank may be configured above ground however when a water tank is employed.

Water treated with the integrated power system as described herein may be from any suitable source including from lakes or ponds, streams, ocean or sea water, grey water and water from oil fracking or hydraulic fracturing processes.

Salt water is water having an elevated salinity of about 0.5 ppt or more. Salt water, such as seawater typically has a salinity of 3 ppt to about 50 ppt and brackish water typically has a salinity of about 0.5 to 30 ppt. Fresh water typically has a salinity of less than 0.5 ppt.

Grey water is relatively clean waste water from baths, sinks, washing machines, and other kitchen appliances not including sewage water having fecal matter.

Water from oil fracking or hydraulic fracturing is water waste or outlets from the process and may contain particles, including sand, rock and other minerals, and hydrocarbon products from the process.

Potable water, as used herein, is water that is safe to drink by humans.

This application incorporates by reference the entirety of Department of Energy Funding Opportunity Announcement (FOA) Number: DE-FOA-0001905 issued on Dec. 13, 2018; CFDA Number 81.086. In this document, four goals are provided:

Based on input to date, DOE has organized the Hub into four topic areas: 1) Materials Research and Development, 2) New Process Research and Development, 3) Modeling and Simulation Tools, and 4) Integrated Data and Analysis, summarized below:

Materials Research and Development (R&D): Materials R&D has the potential to improve materials used in specific components and in water treatment systems so as to improve energy efficiency and lower costs. Desalination and related water treatment technologies can benefit from materials improvements for a range of products, including membranes, pipes, tanks and pumps that dramatically increase their performance, efficiency, longevity and are durable and corrosion resistant.

New Process Research and Development: Novel technology processes and system design concepts are needed to improve energy efficiency and lower costs for water treatment, including new technologies related to water pretreatment systems (e.g., upstream from the desalination unit operation). New process technologies are also needed to address associated challenges such as water reuse, water efficiency, and high-value co-products.

Modeling and Simulation Tools: Multi-scale models and simulation tools are needed to inform the R&D via performance forecasting, design optimization, and operation of desalination technologies and related water-treatment systems that will lead to improved energy efficiency and lower cost.

Integrated Data and Analysis: In order to consistently define, track, and achieve pipe parity in the highest impact areas, central, strategic, non-biased, integrated data and analysis is needed to align the Hub's project-level activities in each of the four topic areas to the Hub goals and to measure technical success of both project-level activities and the overall Hub. There is also a need to develop information resources, studies, and analysis tools necessary to guide the Hub's strategic R&D portfolio.

A control system may be used to control the functions of this integrated system such as opening and closing valves to allow water flow, monitoring and regulating power production and the like. A controller may be located in a remote location from the system and parameters of the system may be monitored remotely and/or on portable or mobile devices.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
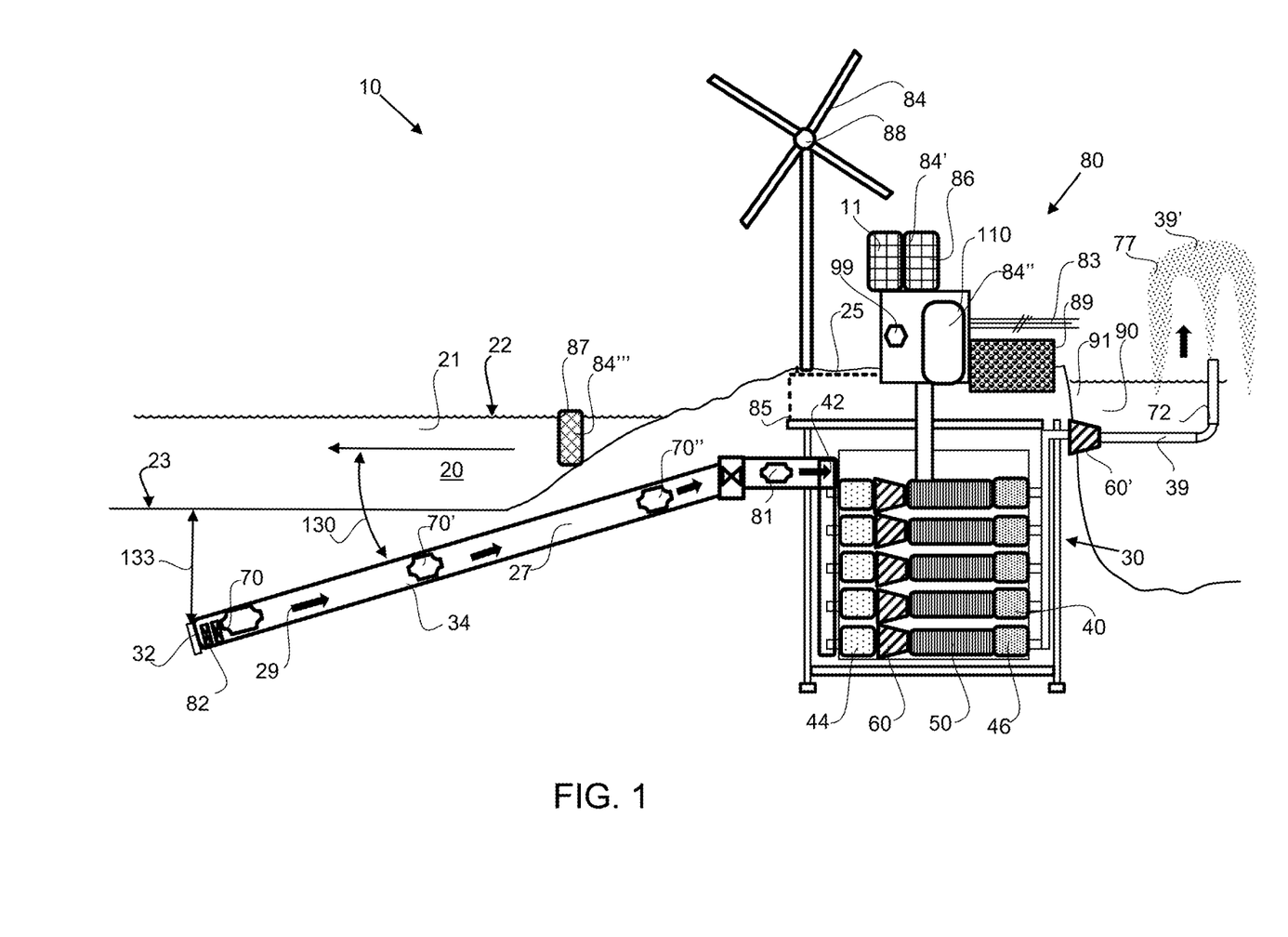
FIG. 1 shows an exemplary integrated power system having a desalination system that receives water from an intake conduit that is configured under a water source, such as the ocean and a plurality of turbines in the intake conduit that produce power.
Figure 4:
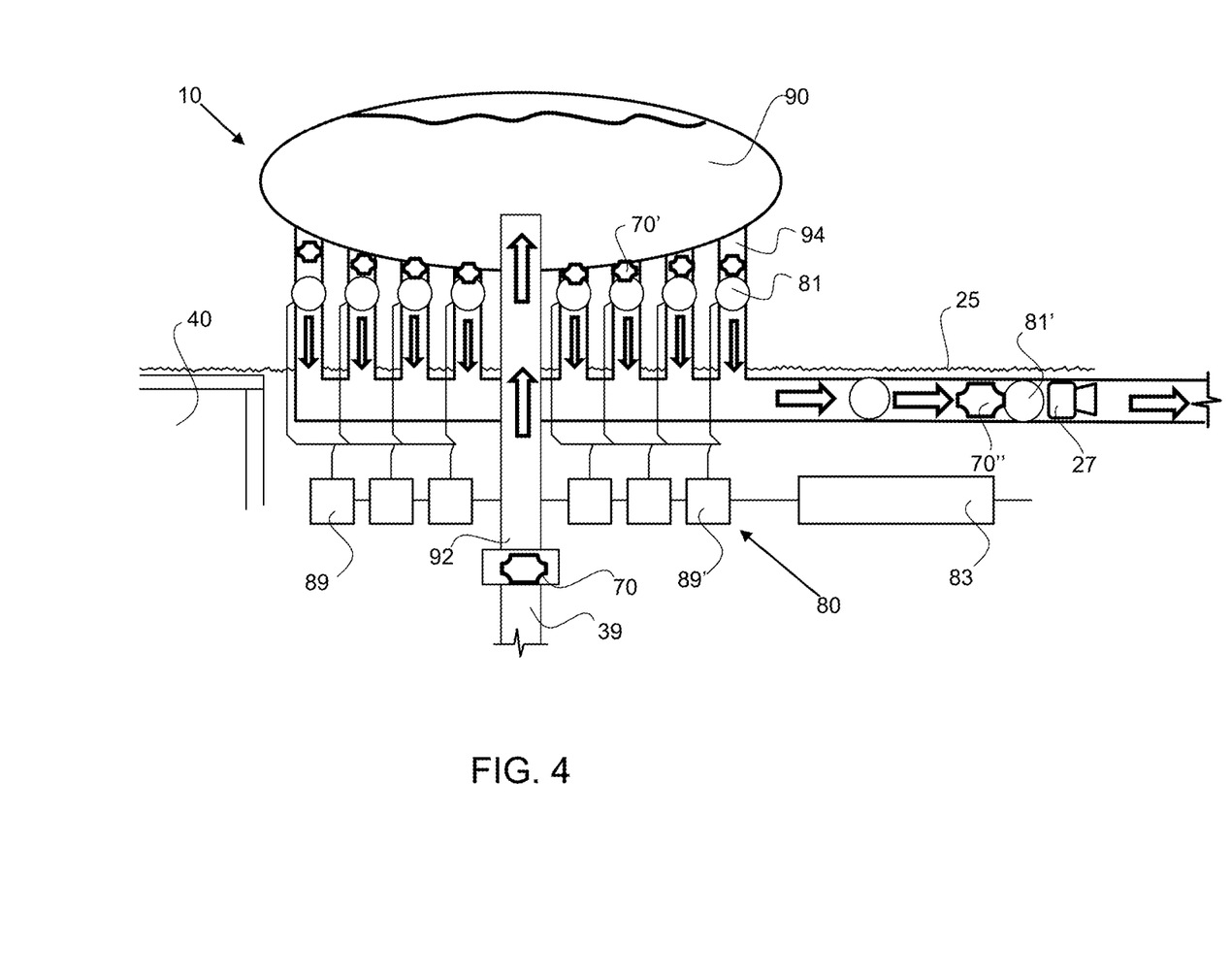
FIG. 4 show an enlarged view of the water tank and power system utilizing turbines configured along the water tank outlet conduit and off to the city water pipes, and in to the city water system, and at the pressure release valves.

Referring to FIGS. 1 and 4, an exemplary integrated power system 10 has a desalination system 30 that receives intake water 29 from an intake conduit 34, that is configured under a water source, such as the ocean, and a plurality of turbines 82 in the intake conduit 34 that produce power for the power system 80. The water intakes 32 are configured an intake depth 133 below the body of water floor 23 of the body of water 21. The intake conduit may extend at a drill angle 130 from horizontal down under the body of water floor. As described herein the depth under the body of water floor may be tens or meters, hundreds of meters to 1000 meters or more. The intake water from reservoirs under the water source 20 floor 23, flows through the water intakes 32, and is pumped by a pump 70 into intake conduit 34 which extends below the body of water floor 23 and then to the inlet 42 of the desalination processor 40. The natural hydrostatic head forces water into the water intakes, through the turbine 82 to spin the turbine and produce power, which is transferred along power line 85 to the power system 80.

The exemplary desalination system comprises a prefilter 44, a structured water system 60, graphene filters 50 and a post filter 46 prior to discharge from the discharge outlet 72. The exemplary desalination processor 40 comprises a prefilter that may be utilized to take out any large debris and particles and may be a physical mesh or physical filter. An exemplary structured water system has a geometry to spiral the prefiltered water to change the composition of the water to have a higher concentration of $H_3O_2$ molecules. The water may vortex through the structured water system and then flow into the graphene filters. As described herein, the graphene filters may comprise a plurality of layers of individual layers of graphene. The filtered water then flows to a post filter, such as an absorbent filter before flowing as clean or desalinated water 39 out of the system, such as into a tank or reservoir.

Figure 2:
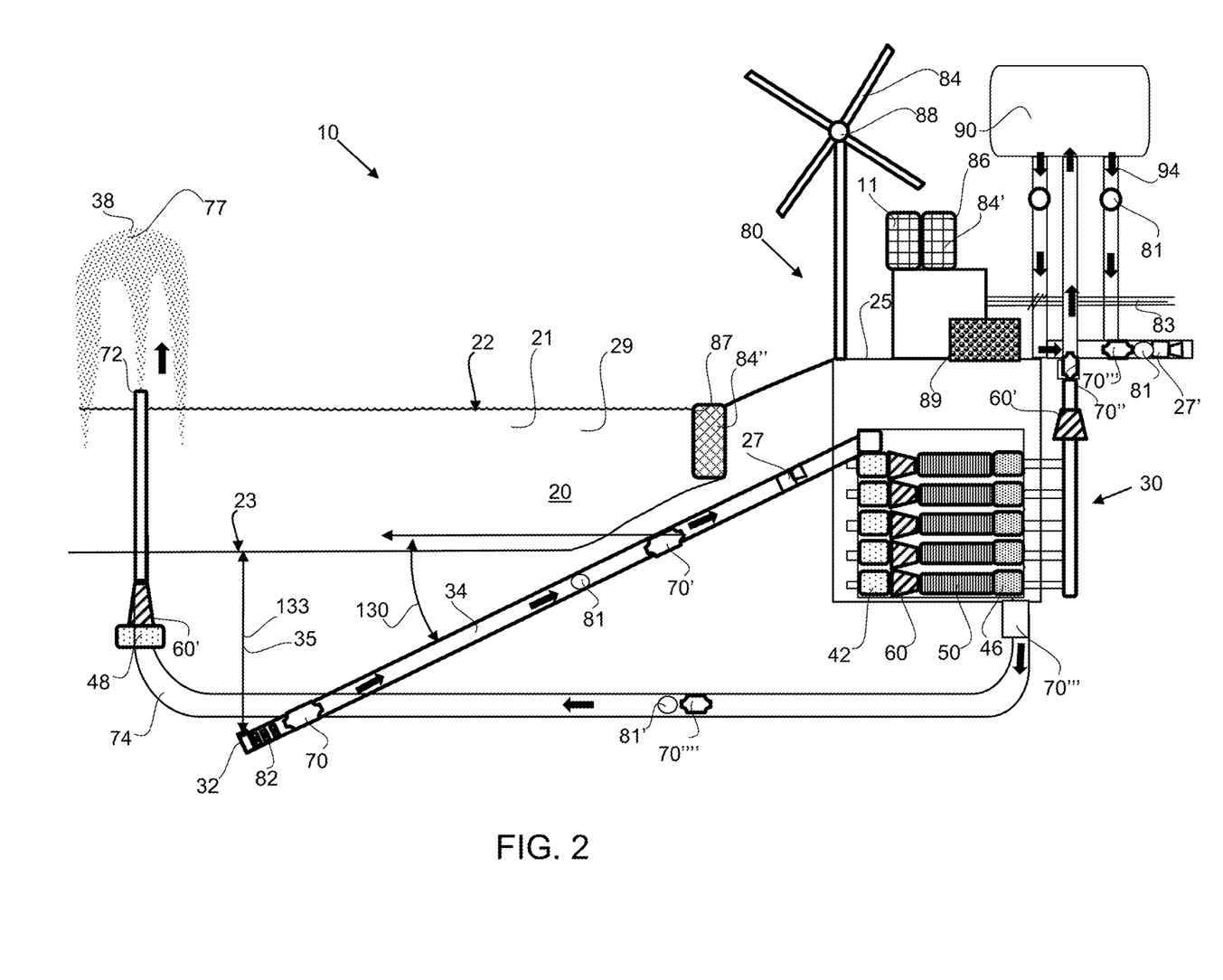
FIG. 2 shows an exemplary integrated power system having a desalination system that receives water from an intake conduit that is configured under a water source, such as the ocean and a discharge conduit that extends back to a body of water to discharge the water from the desalination system after filtered and treated back into the body of water.

As shown in FIG. 1, the discharge water flows into a reservoir and as shown in FIG. 2, the discharge water 38 flows back to the water source body of water 21 through a discharge conduit 74. As shown in FIG. 1 the desalinated water 39 is pumped into a tank 90, such as a reservoir 91. The discharge water 38 may be pumped vertically out into the air to produce a discharge fountain 77 of desalinated water 39', wherein the water is aerated before returning to the reservoir. Also, this discharge fountain may be an attractive feature for tourist, visitors or those living nearby the facility. As shown in FIG. 2, the desalinated water is pumped, by a pump 70" into an elevated tank 90 and discharge water is pumped as a discharge fountain 77 back into the water source 20 or body of water 21. The desalinated water may then be pumped by pump 70''' to a maniple water supply system or to an industrial plant.

The power system 80 comprises the turbines 82 in the intake conduit 34 and/or in the conduit extension 36 that are turned by the flow of intake water 29 through the conduit to produce power. The turbine 81 configured in the intake conduit extension 36 has a pump 70 configured upstream to increase the pressure to the turbine. Any number of pumps, such as high pressure pumps, may be configured prior to a turbine to increase the pressure to the turbine to produce a higher amount power. As described herein and shown in the FIGS. 1 to 6, a pump turbine configuration may be configured on the inlet conduit to the filtration system, between a tank and the filtration system, between the filtration system and a discharge or from a discharge tank to a final water source. The turbines generate power and comprise a generator or are coupled with a generator and transmission lines. The exemplary power system may also comprise a secondary power source 84 to 84''', which may be a renewable power source including a wind turbine 88, photovoltaic cell 86, tidal power system 87 and the like. A secondary power source may be a nuclear generator 110 or reactor such as a small modular reactor, (SMR). An exemplary power system also comprises a battery 89 or battery pack storage building to store power for distribution as required, such as to the pumps, or to a power grid 83.

A control system 99 may be used to control the functions of the integrated power system 10 and power system 80 and may include a controller that receives input from sensor. A controller may open and close valves 27 to control the flow of water from the water intake conduit 34 to the desalination system and may monitor and control power production by the turbines. As described herein, the control system may be in a remote location and system parameters may be monitored remotely and/or on mobile devices.

As shown in FIG. 2, the desalinated water is pumped, by a pump 70''' into an elevated tank 90, and turbines 81 are configured in the water tank outlets 94 to produce power for the power system 80. FIG. 2 shows an exemplary integrated power system having a desalination system that receives intake water 29 from an intake conduit 34 and a discharge conduit 74 that extends back to a body of water 21 to discharge the water from the desalination system back into the body of water. The discharge water 38 flows back to the water source body of water 21 through a discharge conduit 74. Also note that a filter 48 and/or structured water system 60 may be configured on the discharge conduit to treat the discharge to improve the body of water. As shown in FIGS. 1 and 2, a secondary structured water system 60' is configured to process the filtered or desalinated water 39 prior to it being dispensed to the reservoir 91 or tank 90.

Figure 3:
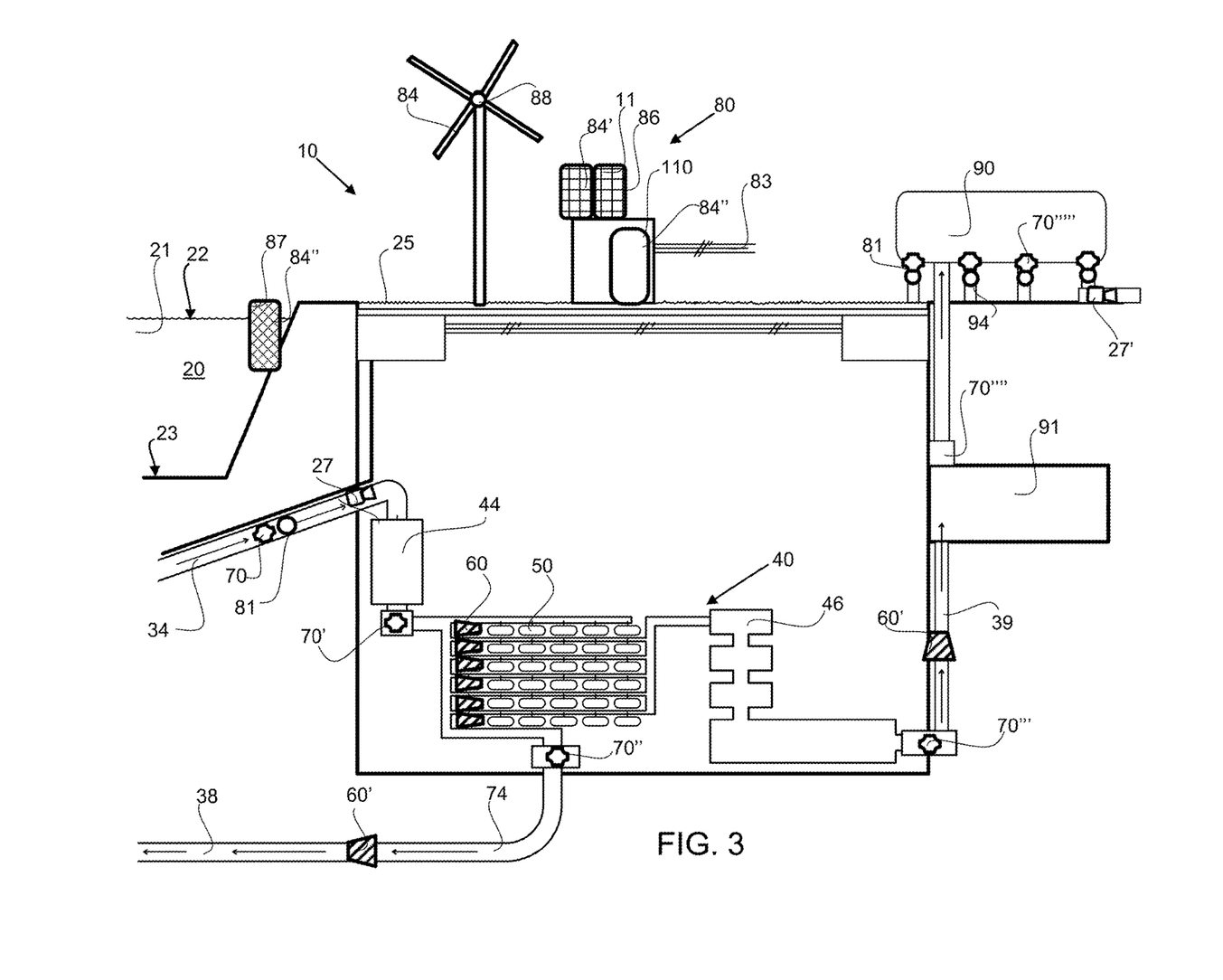
FIG. 3 shows an enlarged view of the desalination system and power system.

As shown in FIG. 3, the desalinated water 39 is pumped from the desalination processor 40 to a reservoir 91 and from the reservoir to an elevated tank 90. A plurality of turbines are configured on the water tank outlet conduits 94 and produce electrical power when water flows from the elevated tank through the outlet conduits. The system comprises a plurality of pumps 70 to 70''' that may receive power from the power system.

As shown in FIG. 4, electrical power is produced by turbines 81 that are powered by the discharge of water from an elevated tank 90 through water tank outlet conduits 94. The power produced may be provided to the power system 80, such as to batteries 89, 89'. Turbines 81' may also be configured in a transfer conduit 96 coupled with the water tank outlet conduit, or along any of the conduits to along the supply lines. Power may be provided to the power grid or to the power system wherein the power, such as DC power is converted to power for distribution or for storage.

Figure 5:
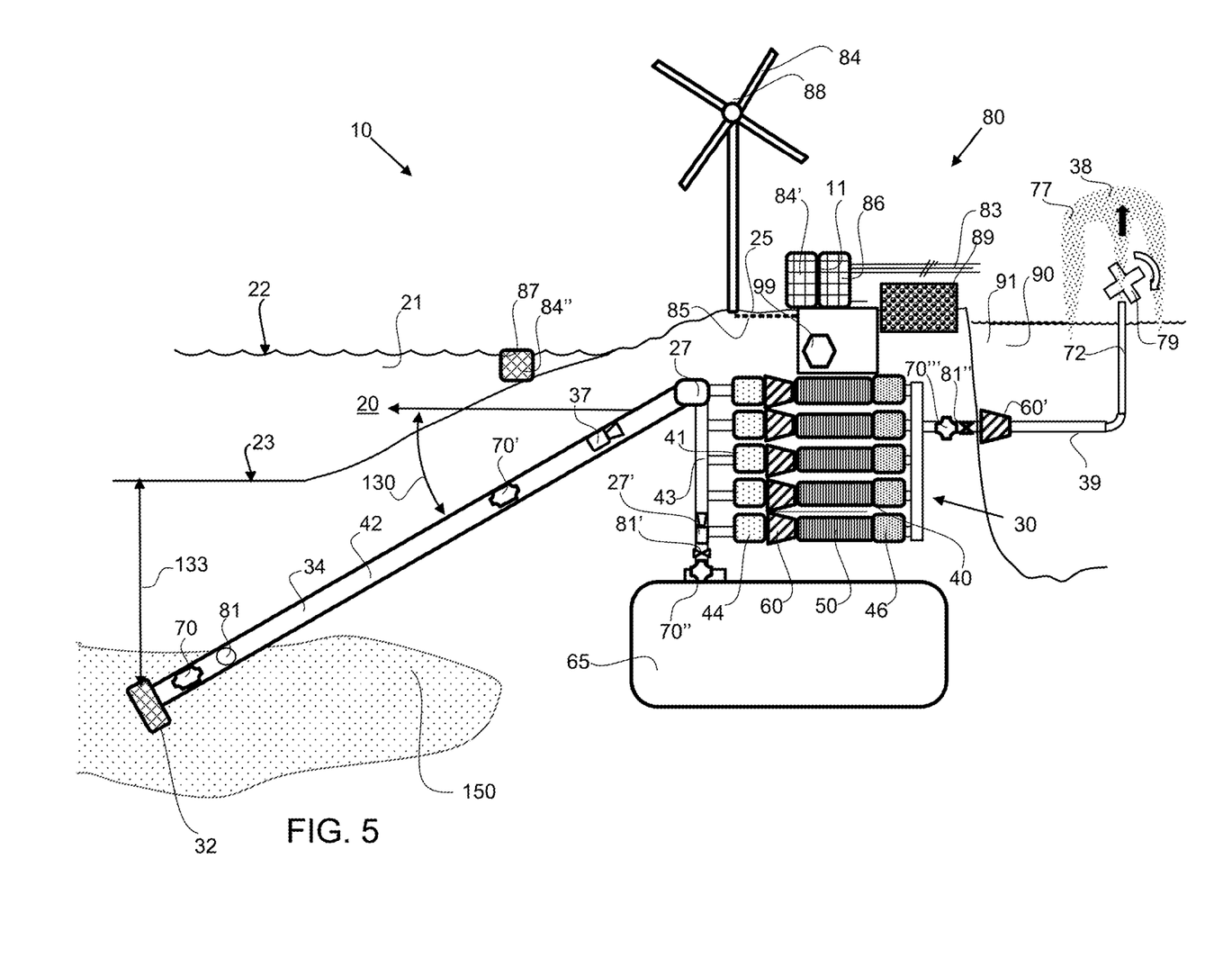
FIG. 5 and FIG. 6 show an exemplary integrated power system having a water intake that is configured in a below-floor water source, under a body of water, such as the ocean, that delivers pressurized water to the integrated power system having a filtration process for cleaning the inlet water.
Figure 6:
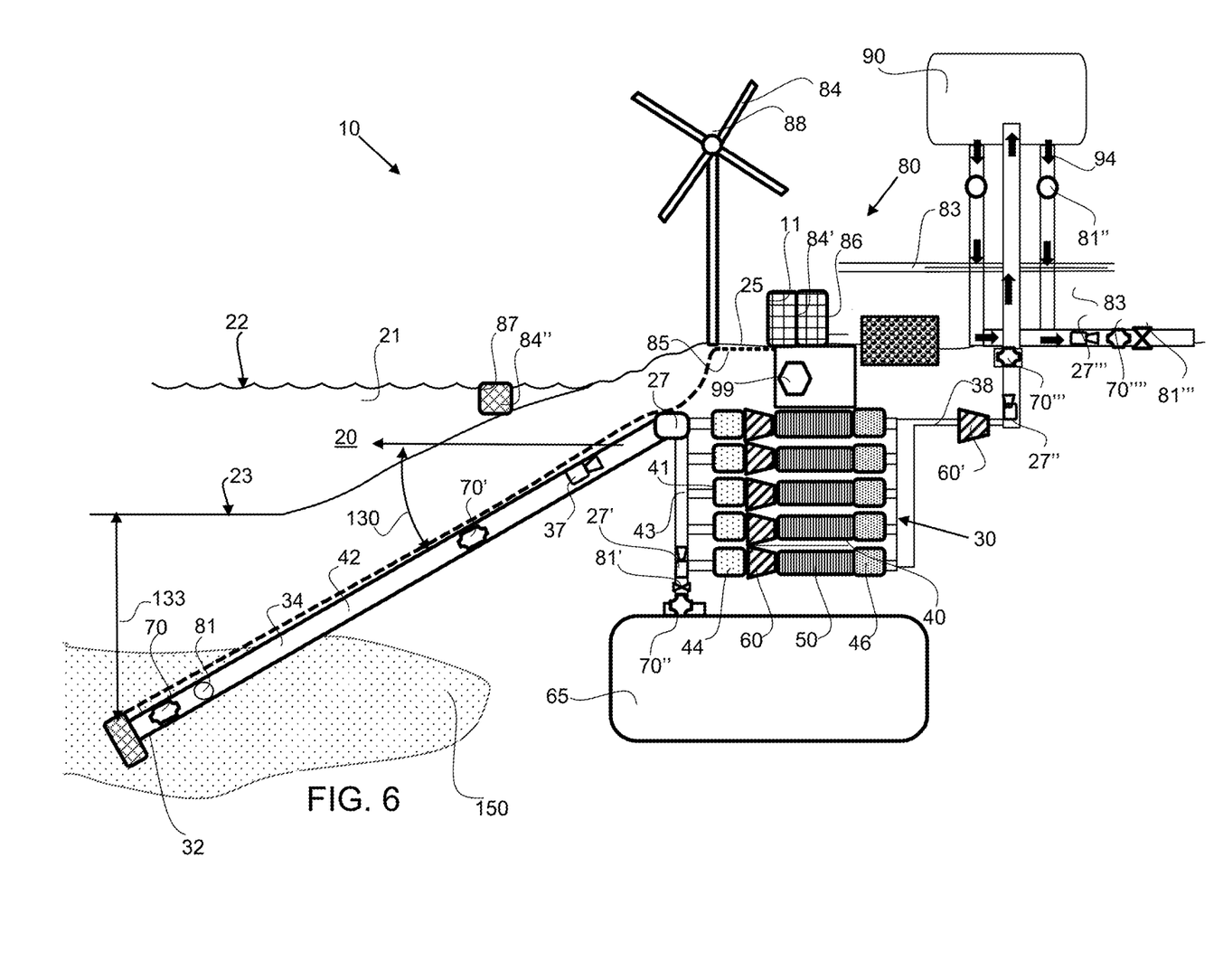

Referring to FIGS. 5 and 6, an exemplary integrated power system 10 is configured substantially underground with the intake conduit, the desalination system and the power system all configured underground. The integrated power system has a desalination system 30 that receives intake water 29 from an intake conduit 34 and a plurality of turbines 82 in the intake conduit 34 that produce power for the power system 80. The water intakes 32 are configured a below-floor water source 150, and a filtration intake depth 133 below the body of water floor 23, of the body of water 21. The intake water is pumped through the intake conduit 34 which extends below the body of water floor 23 and then to a tank 65 that delivers the intake water to the desalination system. The intake water may be kept under pressure in the tank due to the hydrostatic head and then be delivered to the filtration system 41 through valve 27'. An intake pump 70' may provide additional pressure to the intake water to force the water through the filtration system. The pressure may be about 40 psi or more, about 60 psi or more, about 80 psi or more, about 100 psi or more and any range between and including the values provided. The desalination processor 40 or filtration system may include a prefilter 44, a structured water system 60, graphene filters 50 and a post filter 46. Power may be generated by turbines 81, 81' from the flow of pressurized water through the system. Turbine 81 is configured between the water source and the tank 65 and may be configured in the intake conduit as shown and turbine 81' is configured between the tank and the filtration system 41 and may be before or after the pump 70. As shown in FIG. 5, the discharge conduit 72 may extend up and out from the desalination system at a discharge offset distance from the water surface level of the body of reservoir 91, and a pump 70''' may be used further pressurize the desalinated water prior to discharge.

As shown in FIG. 5, the discharge water 38 is flowing from the discharge outlet 72 into a water reservoir 91, and this discharge water may be desalinated water 39 or potable water that has been cleaned through the filtration process. The discharge water 38 may be pumped vertically out into the air to produce a discharge fountain 77 of desalinated water 39', wherein the water is aerated before returning to the reservoir. A discharge feature 79, such as a spinning feature with lights may be coupled with the discharge outlet to produce an attractive visual display of the water discharge.

As shown in FIG. 6, The discharge water 38 is pumped by pump 70''' into a water tank 90, which may be elevated to provide hydrostatic pressure for water deliver from said tank. Also note that a turbine 81'' may be configured between the filtration system 41 and the water tank 90. Also, turbines 81''' may be configured to produce electrical power from the flow of water from the tank to a delivery location.

Figure 7:
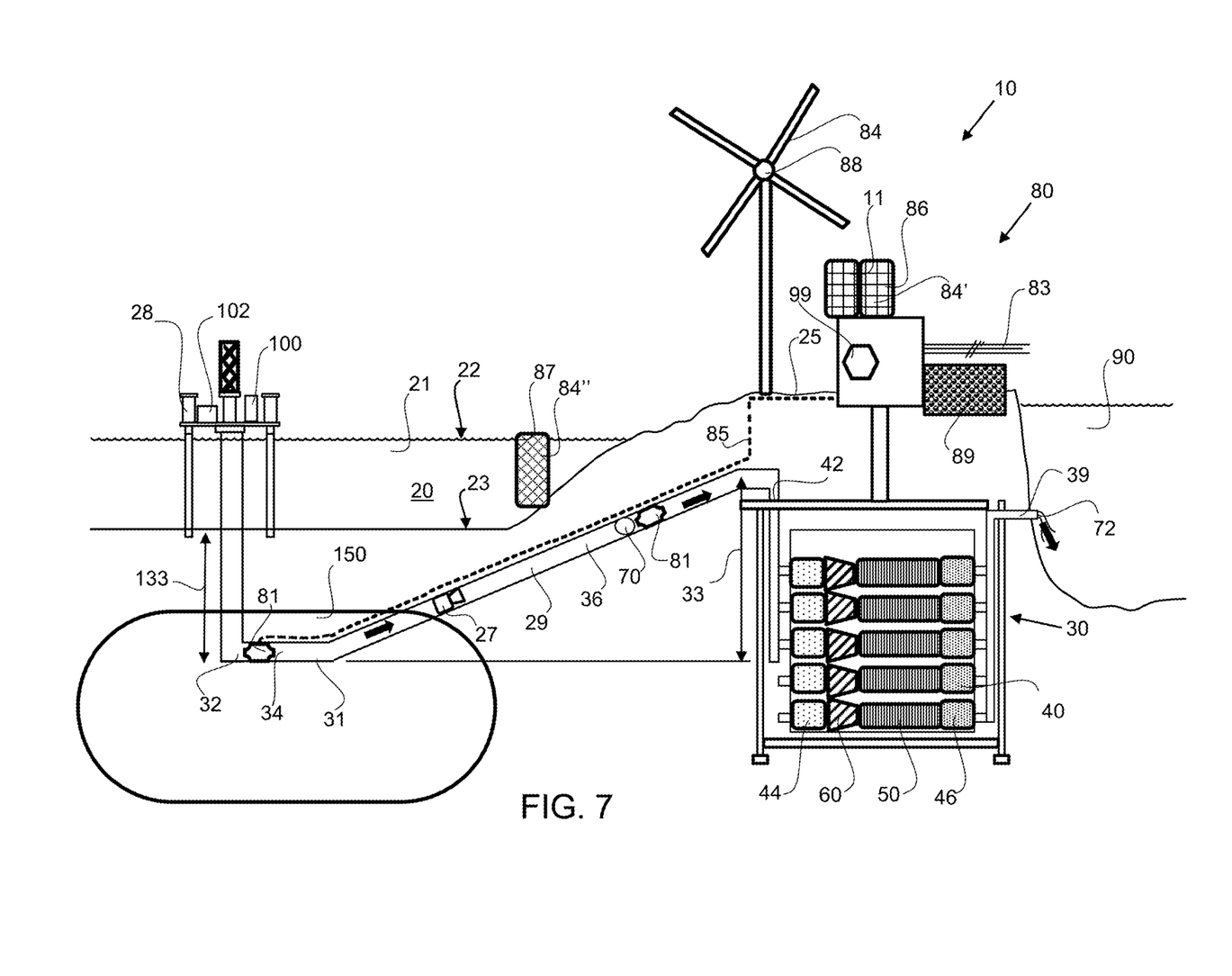
FIG. 7 shows an exemplary integrated power system having a water intake that is configured in a below-floor water source, under a body of water, such as the oceanbody of water floor, that delivers pressurized water to the integrated power system having a filtration process for cleaning the inlet water.

As shown in FIG. 7, an exemplary integrated power system 11, as described herein, has an intake conduit 34 that extends down from a platform 28 configured over a body of water 21, such as an ocean or sea. The intake conduit extends down through the body of water 21, down under the body of water floor 23, to a below-floor water source 150. The intake conduit may extend further to a power system 80 and/or desalination system 30 configured on the land. The intake may be a filtration intake depth 133, as shown.

Figure 8:
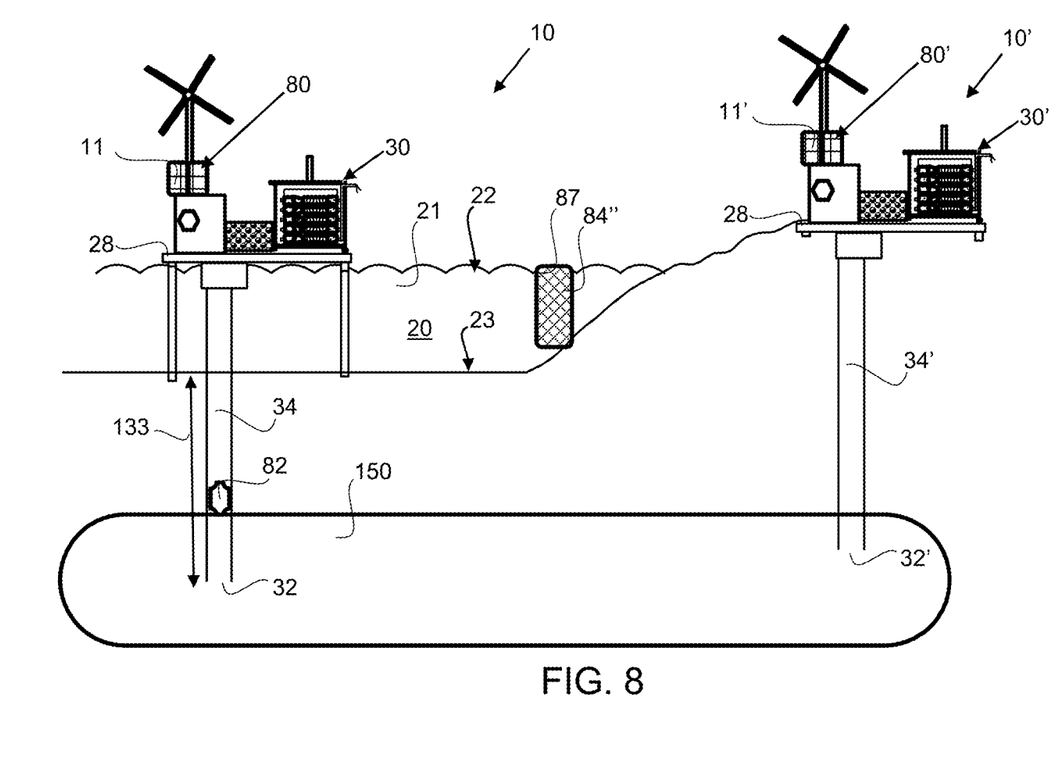
FIG. 8 shows an exemplary integrated power system having a water intake that extends down from a platform, through a body of water, and into a below-floor water source, under said body of water, such as the oceanbody of water floor.

As shown in FIG. 8, an exemplary integrated power system 11 has a water intake 34 that extends down from a platform 28, through a body of water 21, below the body of water floor 23 and into a below-floor water source 150. The power system 80 and desalination system 30 are configured on the platform. A secondary integrated power system 11' is configured on land, or shore proximal to the body of water 20, and has an intake conduit 34' that extend substantially straight down, or within about 20 degrees of vertical to the same below-floor water source 150. As shown the below-floor water source 150 extends some distance under the shore or land from the below the body of water 20. The secondary integrated power system 11' has a power system 80' and a desalination system 30'.

Figure 9:
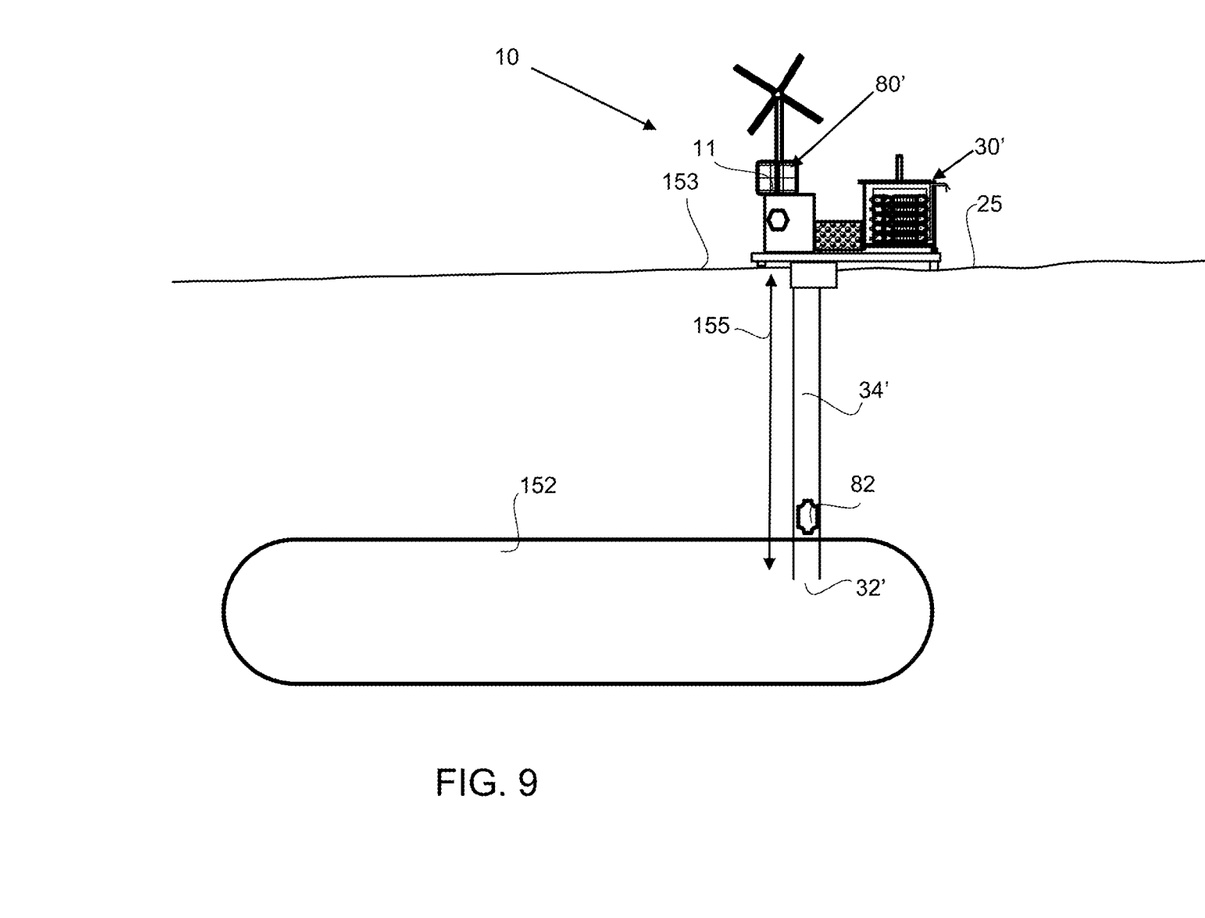
FIG. 9 shows an exemplary integrated power system having a water intake extends down from a platform into a deep water source that is more than 100 m deep from the ground surface.body of water floor Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As shown in FIG. 9, an integrated desalination-power system 10 or integrated power system 11, is configured on land and has an intake conduit 34 that extends down a depth 155 from the ground surface to a deep water source 152 or a water source configured at least 100 m below the ground surface. This depth is measured from the ground level 25, or a ground surface 153 to the deep water source. The water within the deep water source may be fresh and may not require the desalination system 30 of the integrated power system 11. A turbine 82 is configured in the intake conduit to produce power as the water from the deep water source is pumped up to the integrated desalination-power system 10.

A water source may be an effluent from a process such as from oil fracking, or hydraulic fracturing, grey water, ocean or sea water and the like.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. An integrated desalination-power system comprising:
   a) a desalination system comprising:
      i) a water intake configured in a below-floor water source;
      ii) a desalination processor comprising:
         a graphene filter comprising a plurality of graphene layers; and
         a structured water system configured prior to the graphene filter;
      wherein the structured water system produces water with an elevated concentration of $H_3O_2$, wherein the elevated concentration is at least 20% higher than distilled water; and iii) an intake conduit extending from the water intake to an inlet of the desalination processor that is elevated above the water intake-depth a hydrostatic head height;

wherein the desalination processor produces desalinated water from the intake-water;

b) a power system configured to produce electrical power comprising:

i) a turbine configured in the conduit;

wherein the turbine is turned by a flow of water through the inlet conduit to produce electrical power.

2. The integrated desalination-power system of claim 1, wherein the below-floor water source is configured under a body of water.

3. The integrated desalination-power system of claim 2, wherein the body of water is an ocean, large lake or sea.

4. The integrated desalination-power system of claim 1, wherein the intake conduit extends from the integrated power system to a deep water source that is at least 100 m below a ground surface.

5. The integrated desalination-power system of claim 1, wherein the water intake-depth is at least 100 m from the desalination processor.

6. The integrated desalination-power system of claim 1, wherein the water intake-is configured a filtration intake depth of at least 15 m below the body of water.

7. The integrated desalination-power system of claim 1, wherein the water intake-is configured a filtration intake depth of at least 50 m below the body of water.

8. The integrated desalination-power system of claim 1, wherein the intake conduit extends from the below floor water source to a shore configured around the body of water and wherein a drill angle extends at least 10 degrees from horizontal.

9. The integrated desalination-power system of claim 1, wherein the desalination processor comprises a post filter after the graphene filter.

10. The integrated desalination-power system of claim 1, further comprising a secondary structured water system configured to treat the desalinated water from the desalination processor.

11. The integrated desalination-power system of claim 1, wherein the structured water system comprises a vortex portion.

12. The integrated desalination-power system of claim 1, wherein the desalination system further comprises a discharge conduit having a discharge outlet.

13. The integrated desalination-power system of claim 1, wherein the power system comprises a secondary power source comprising a nuclear generator.

14. The integrated desalination-power system of claim 1, further comprising a water tank for receiving the desalinated water and wherein a turbine is configured in a water tank outlet conduit to produce power when water is discharged from said water tank through said water tank outlet conduit.

15. The integrated desalination-power system of claim 1, comprising a pump configured to increase the pressure of the intake water into the desalination processor.

16. The integrated desalination-power system of claim 1, wherein the water intake receives grey water.

17. The integrated desalination-power system of claim 1, wherein the water intake receives water from an oil fracking process.

18. The integrated desalination-power system of claim 1, wherein the water intake receives water from a hydraulic fracturing process.

19. The integrated desalination-power system of claim 1, wherein the intake conduit extends to a platform and wherein the power system is configured on the platform.

20. The integrated desalination-power system of claim 1, wherein the below-floor water source is configured under a body of water, wherein the body of water is an ocean, large lake or sea, wherein the water intake-is configured a filtration intake depth of at least 15 m below the body of water, and wherein the intake conduit extends from the below floor water source to a shore configured around the body of water and wherein a drill angle extends at least 10 degrees from horizontal.

* * * * *